United States Patent [19]

Fernandez

[11] Patent Number: 4,851,820

[45] Date of Patent: Jul. 25, 1989

[54] PAGING DEVICE HAVING A SWITCH ACTUATED SIGNAL STRENGTH DETECTOR

[76] Inventor: Emilio A. Fernandez, 1019 Salt Meadow La., McLean, Va. 22101

[21] Appl. No.: 114,648

[22] Filed: Oct. 30, 1987

[51] Int. Cl.[4] ........................ H04Q 7/02; H04B 7/26; H04B 17/00

[52] U.S. Cl. ........................ 340/825.440; 455/67; 455/226; 455/229

[58] Field of Search .............. 340/539, 825.44, 825.47, 340/825.48, 311.1; 455/31, 228, 229, 9, 10, 33, 52, 67, 226, 351, 134, 135; 371/5; 379/57, 58, 59, 56

[56] References Cited

U.S. PATENT DOCUMENTS

| | | | |
|---|---|---|---|
| 2,882,390 | 4/1954 | Kuhl, Jr. et al. | 455/228 |
| 3,916,379 | 10/1975 | DuLaney et al. | 371/5 |
| 4,017,748 | 4/1977 | Davis | 455/228 |
| 4,032,723 | 6/1977 | Mendoza | 370/30 |
| 4,034,340 | 7/1977 | Sant'Agostino | 455/226 |
| 4,072,900 | 2/1978 | Ray | 455/67 |
| 4,186,351 | 1/1980 | Brefini et al. | 455/226 |
| 4,438,433 | 3/1984 | Smoot et al. | 455/31 |
| 4,580,287 | 4/1986 | Richards, Jr. | 455/226 |
| 4,649,538 | 3/1987 | DeLuca et al. | 371/5 |
| 4,675,656 | 6/1987 | Narcisse | 340/539 |
| 4,701,759 | 10/1987 | Nadir et al. | 340/825.44 |

FOREIGN PATENT DOCUMENTS

| | | | |
|---|---|---|---|
| 2178270 | 2/1987 | United Kingdom | 455/67 |

*Primary Examiner*—Donald J. Yusko

*Assistant Examiner*—E. O. Pudpud

*Attorney, Agent, or Firm*—Whitham & Marhoefer

[57] ABSTRACT

A paging device includes a radio receiver (10-20) and decoding circuitry (22) for receiving an encoded transmitted signal and operates an indicator (26) to alert a user that a call has been received. A signal strength detector (30) monitors the strength of a carrier for a transmitted signal and provides a voltage level proportional to the carrier signal strength. A switch (33), when enabled, connects the voltage level from the detector (30) to a voltage controlled oscillator (32) which provides an output having a frequency proportional to the monitored strength of the carrier signal. The output of the variable frequency oscillator (32) is connected to the indicator (26) to provide the user with an indication of whether transmissions may be reliably received. The variable frequency oscillator may be replaced by a threshold device (35) to simplify the paging device, or the basic system may be provided with an averaging device (27) so that the user may select between instantaneous and average values of the strength of the monitored carrier signal. In an alterative embodiment, the paging device may be implemented using a microprocessor (23) controlled by a program stored in ROM (25) as the decoder. In this implementation, the microprocessor may be programmed to perform additional functions including computing the error rate of decoded messages, and if the error count exceeds a predetermined threshold, alerting the user of an unreliable radio link. A further refinement allows the user to monitor the error rate.

20 Claims, 6 Drawing Sheets

PAGING DEVICE HAVING A SWITCH ACTUATED SIGNAL STRENGTH DETECTOR

BACKGROUND OF THE INVENTION

1. Field of the Invention

The subject invention is directed to a paging device which tells the user whether he or she is in range of the paging transmitter and, more particularly, to a paging device which checks the carrier signal strength and provides the user with an aural, visual, or tactile output if the paging device is in range of the transmitter. Another aspect of the invention is the provision in a paging device which allows the user to monitor the error rate of decoded messages and thereby monitor the performance of the device at a given location.

2. Description of the Prior Art

Paging devices are in common use by professionals, executives, and many others in virtually all urban and many suburban areas. In a standard paging system, a signal is transmitted from a transmitter to alert a person with a paging device that his or her office or similar base station wishes to communicate with them. The transmitted signal is received by the paging device and identified as being intended for that particular device. An alerting signal is generated which indicates to the user that he or she is being paged.

In ordinary paging devices, a user cannot tell if he or she is out of range of the paging transmitter or shielded from the paging transmitter and, as a result, missing urgent and important communications. A sophisticated user who might suspect such a possibility, might go to a pay telephone and try calling him or herself to see if the pager is activated. This, however, has limitations as the user is only able to confirm an in range or out of range condition at the location of the pay telephone but generally not at the location where he or she is most likely to be. The alternative is to call in to the head office at regular intervals to get his or her messages, but this defeats the purpose of the pager.

An example of a commercially available paging device is Motorola's "Pagecom" radio pager, and there are many others. In the patent literature, U.S. Pat. No. 3,911,416 to Feder and assigned to Motorola describes a silent call pager that produces a vibratory alerting signal when the paging signal is received. Ishii in U.S. Pat. No. 4,462,030 describes an audible annunciator with an alarm lamp for a paging device. U.S. Pat. Nos. 4,019,142 to Wycoff and 4,431,990 to Wycoff et al. disclose selective call communication receivers for use in paging systems. None of these, however, contemplate any means for detecting whether a paging device is out of range of the transmitter and alerting the user of that fact.

Also known in the prior art are voice message pagers which alert the user with an audible voice message. Such pagers typically have a squelch circuit that operates to prevent any audible output except for those messages which are identified as for that pager. A sophisticated user of such a voice message pager might open the squelch in an effort to monitor the channel activity. But even if the thought occurred to such a sophisticated user, which is unlikely, it would be difficult to accurately judge the quality of the signal.

More recently, pagers have been implemented using microprocessors so that many of the functions that were previously hardwired into the device are now controlled by the microprocessor under software or firmware control. Typically, the microprocessor is used to perform the decoding and logic functions which were previously performed by discrete logic circuits. This results in a simplification of the circuitry by reducing the chip count on the pager printed circuit board, but at the same time introduces an increased level of sophistication by permitting more complex functions to be programmed. A specific example is the ability to provide error detection and correction. Examples of pagers using microprocessors in decoding functions are U.S. Pat. Nos. 4,383,257 to Giallanza et al., 4,384,361 to Masaki, 4,438,433 to Smoot et al., 4,536,761 to Tsunoda et al., 4,613,859 to Mori, 4,642,632 to Ohyagi et al., and 4,682,148 to Ichikawa et al.

It is known in diverse arts to provide signal strength measurement or range detecting capabilities. For example, U.S. Pat. No. 4,032,723 to Mendoza discloses a cordless telephone system which provides an "out-of-range" indicator on the mobile telephone and, if desired, on the base station. The indicator signals that the telephone is at a range in excess of the operating capability of the system. The Mendoza cordless telephone is specifically useful when walking from room to room in a house and at no time more than a short distance from the base station.

U.S. Pat. No. 4,675,656 to Narcisse discloses an out of range personnel monitor and alarm. The device alerts an attendant that a supervised person has walked beyond a predetermined prescribed distance. U.S. Pat. No. 4,661,996 to Scandurra discloses a method for indicating radio frequency carrier loss in remotely controlled vehicles. More specifically, circuitry is provided on a remotely controlled airplane which determines the loss of a carrier and therefore the loss of remote control. U.S. Pat. No. 4,060,767 to Lohrmann discloses a self test circuit for multichannel radio receivers which reports to the operator whether or not the receiver is sensitive to receive signals within a plurality of channels.

The problem of missing urgent and important calls because a paging device is either out of range of the transmitter or shielded from the transmitter has not been addressed in the prior art. The problem is particularly acute in the very environment where pagers are most used, that is, cities where buildings and population are most dense. The user of a pager in this environment naturally assumes that as long as he or she is within the city, they will receive all pages. However, due to shielding by buildings and other structures, this may not be the case. In fact, even within the same room there may be variations in sensitivity in different locations which could make the difference between receiving and missing a page.

SUMMARY OF THE INVENTION

It is therefore an object of the present invention to provide an improved paging device which provides an indication to the user whether he or she is in range of the paging transmitter.

It is another object of the subject invention to provide a paging device that will provide an indication to the user when reception of transmission from the base station or paging transmitter is becoming weaker.

According to the invention, a paging device is provided with a button which the user may press to obtain an indication as to whether the paging device is within range or properly located to receive transmissions. This button may be specially provided for the purpose, but in the preferred embodiment, the button is the same button that the user would press to turn off an audible, visual or tactile indicator energized in response to a properly decoded paging signal. Some pagers are provided with a slide switch having three positions, on-off-memory, and this switch could be adapted for the purpose as well. The same indicator, whether audible, visual or tactile, is used to provide the user with an indication as to whether a transmission will be received. In the preferred embodiment, this is simply accomplished by monitoring the presence of a received carrier signal. If present, the paging device will confirm the presence of the carrier signal.

Another aspect of the invention is to provide a paging device which will communicate to the user when his or her reception of the carrier signal is becoming weaker, indicating a potential or imminent loss of reception. For example, a slowly flashing light, an on/off beeping sound with relatively long periods between beeps, or a tactile output with similar characteristics would alert the user that they are in danger of losing reception. On the other hand, a rapidly flashing light, a beeping sound with short periods between beeps or similar characteristic tactile output would reassure the user that reception will be good for any pages directed to them. It is possible, for example, for someone attending a meeting to select a seat where the best reception will be assured by simply moving to different locations in the meeting room and pressing the button on the pager and observing the output from the indicator.

A further aspect of the invention is to provide a pager of the type which uses a microprocessor for decoding functions with the capability to detect the loss of reception of the carrier signal or the accumulation of a significant number of decoding errors and alert the user. The microprocessor program may also include the same test capabilities as the hardwired type of pagers.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF PREFERRED EMBODIMENTS OF THE INVENTION

Figure 1:
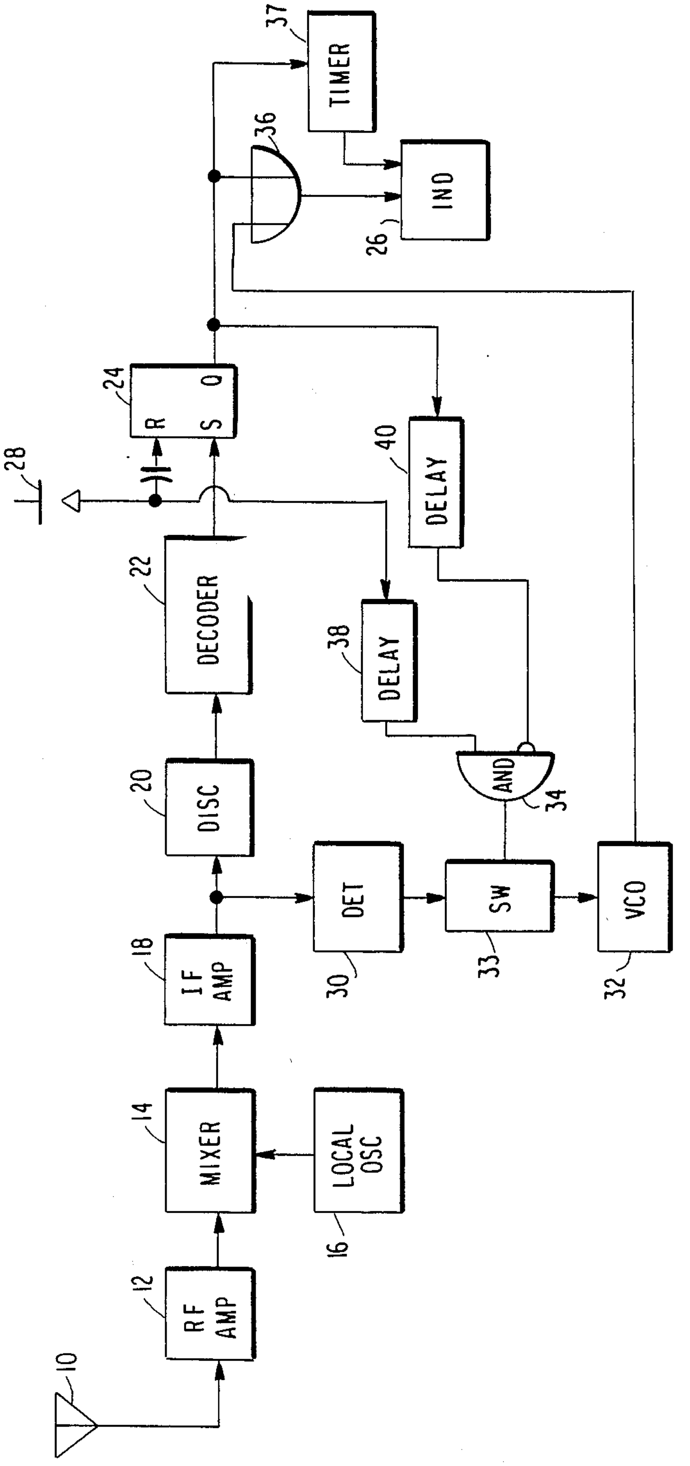
FIG. 1 is a block diagram of a preferred embodiment of a pager according to the present invention.

Turning now to the drawings, and more particularly to FIG. 1, there is shown a pager comprising an antenna 10 feeding radio frequency (RF) amplifier 12. The output of the RF amplifier 12 is supplied as one input to a mixer 14. The other input to the mixer 14 is supplied by a local oscillator 16. The output of the mixer 14 is an intermediate frequency (IF) signal which is amplified by IF amplifier 18. The output of IF amplifier 18 is supplied to a discriminator 20 which provides a demodulated output signal to a decoder 22.

What has been described thus far is a conventional super heterodyne receiver for a pager. Those skilled in the art will realize that this description is merely illustrative of the receivers that may be employed in pagers. A method that has gained some popularity in large scale integration (LSI) devices is the so-called "direct" method, and it will be appreciated that LSI devices using this method, as well as other techniques of radio reception, could be used in place of the super heterodyne receiver just described.

If the demodulated output from the discriminator 20 is decoded by the decoder 22 to match the code for this particular pager, then the decoder 22 would provide an output to the set input of memory latch 24 which would enable the indicator 26. The decoder 22 may be any well known type appropriate to the input signal. For example, the decoder may include audio recovery from the IF and subsequent de-FSKing to recover a binary bit stream at baseband. The binary bit stream may then be subjected to further processing depending on the code protocol used.

As described before, the indicator 26 could be an audio, visual or tactile indicator or a combination of these. The indicator 26 could also be a small screen, for example a liquid crystal display (LCD), which provides a short message of a few characters, such as a telephone number. Once the user is alerted of a call by the indicator, the user would press a push button switch 28 to reset the latch 24 thereby turning off the indicator 26. Should the user fail to turn off the indicator by pressing the button switch 28, a timer 37 having about a five second time out period is activated by the Q output of latch 24 and provides an output that is effective to turn off the indicator 26. This prevents a continuous output which would have a tendency to run down the batteries of the pager and/or become annoying to others near the pager.

According to the invention, a detector 30 is connected to the output of the IF amplifier 18. This detector detects the output of the IF amplifier and provides a d.c. voltage proportional to the instantaneous strength of the IF signal. The IF signal is in turn proportional to the carrier strength of the received carrier. The output of the detector 30 is supplied to a voltage controlled oscillator (VCO) 32 via an analog signal switch 33, such as a field effect transistor (FET), controlled by an AND gate 34. The output of the VCO is a signal having a frequency proportional to the d.c. voltage from the detector 30 and hence proportional to the received carrier. This output is supplied via an OR gate 36 to the indicator 26 to provide the user with an indication of the strength of the received carrier.

The AND gate 34 is enabled for a short period of time by pressing the same push button switch 28 as is used to turn off the indicator 26. When switch 28 is pressed, it enables a delay 38, such as a one-shot, for a short period of time. The output of the delay 38 provides an enabling signal to AND gate 34 thereby temporarily connecting the output of the detector 30 to the VCO 32. Alternatively, the delay 38 can be eliminated so that the enablement of the AND gate 34 is under the direct control of the user when switch 28 is pressed. This allows the user to obtain an instantaneous reading which could be useful, for example, in "mapping" a room. In other words, the user could go from place to place within a room and make instantaneous readings to determine what, if any, variations in carrier strength are detected in the room.

In order not to interfere with an incoming page, a second delay 40 is provided. This delay has a time period substantially longer than that of delay 38 and is triggered by the Q output of the latch 24. The output of delay 40 is provided to an inhibiting input of AND gate 34 and thereby prevents the output of detector 30 from being supplied to the VCO 32 during a page.

Figure 2:
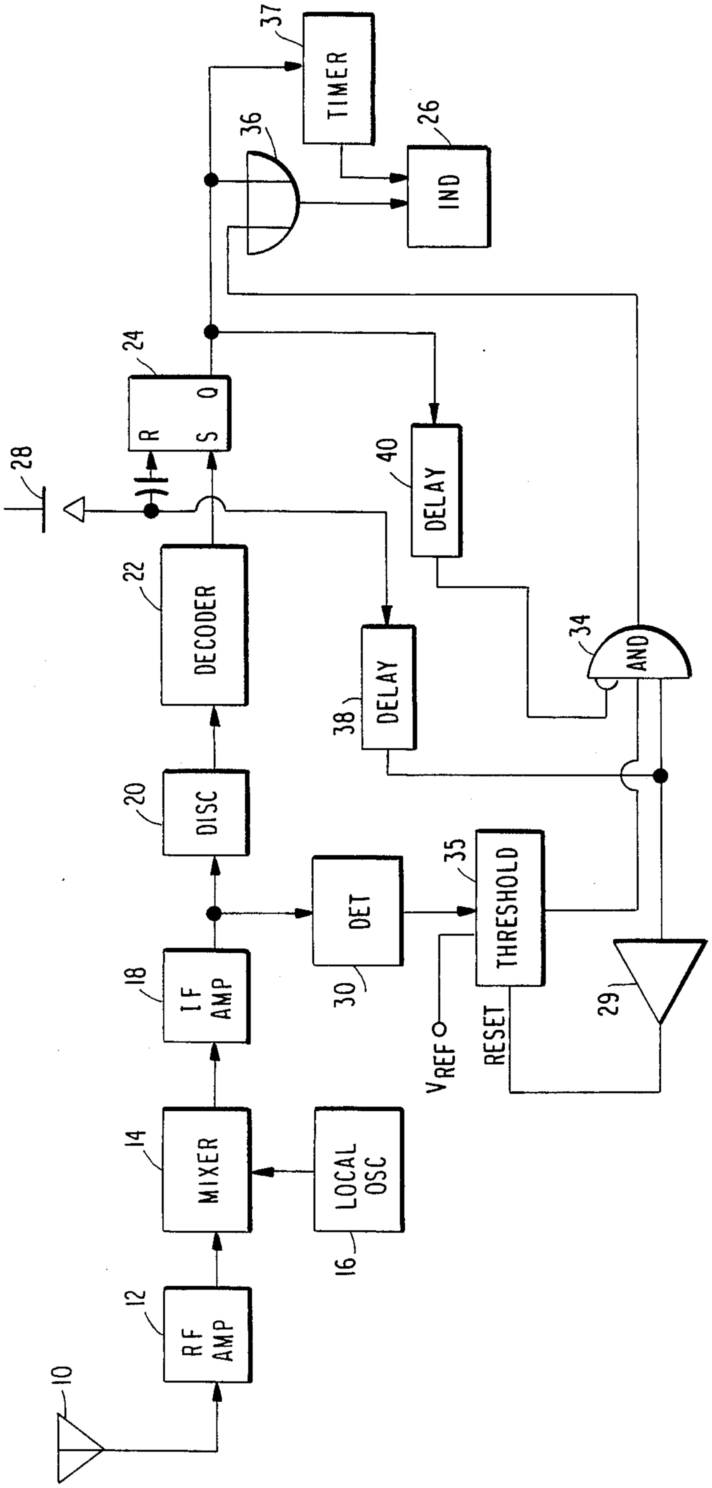
FIG. 2 is a block diagram of a simplified, less expensive version of the pager shown in FIG. 1.

The basic pager according to the invention can be simplified by eliminating the VCO 32 and substituting a threshold device 35 as shown in FIG. 2. This threshold device is connected to receive, as one input, the output of detector 30 and, as another input, a voltage reference corresponding to a minimum level of carrier for which transmissions may be reliably received. The threshold device 35 may be a Schmitt trigger, for example, which when triggered, provides a digital output indicating that the threshold has been exceeded. Such a device needs to be reset once triggered, and for this purpose an inverter 29 is provided. More specifically, until the button switch 28 is depressed, the output of delay 38 is a binary zero. This is inverted by inverter 29 to provide a binary one to the reset terminal of the threshold device 35, thereby maintaining this device in a reset condition. When the button switch 28 is pressed, the output of the inverter 29 becomes a binary zero, releasing the threshold device 35 to compare the output of the detector 30 with the reference voltage. The output of the threshold device 35 is supplied as a third input to AND gate 34. Thus, if the threshold device 35 is triggered, a digital output from AND gate 34 is supplied to OR gate 36 to energize the indicator 26. If the indicator 26 is a display screen, such as an LCD, it could be programmed to provide a suitable readout, such as "GOOD" or "OK".

Figure 3:
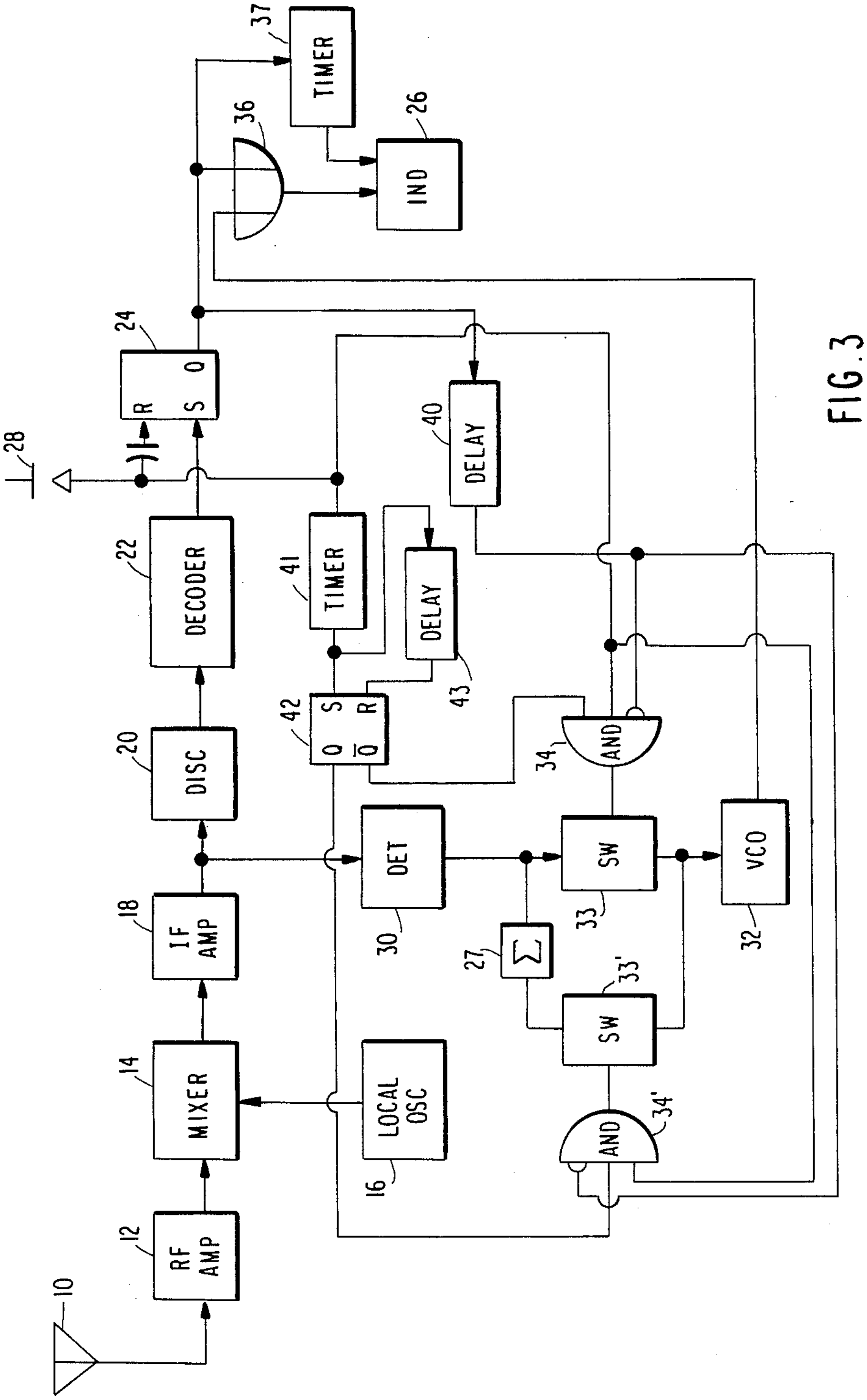
FIG. 3 is a block diagram of a further modification of the pager shown in FIG. 1 which provides an additional feature of an average value indication.

The modification shown in FIG. 2 may be described as a go or no go type of output. In other words, the simplification provided by the use of threshold device instead of the VCO, while providing some economies, is achieved at the expense of the amount of information which may be communicated to the user. It is also possible to modify the basic pager shown in FIG. 1 to provide been more information to the user as shown in FIG. 3. In this modification, two analog switches 33 and 33' are provided which are connected to the input of VCO 32. However, the input of switch 33' is provided by an averager 27, such as an RC circuit having a suitable time constant, which averages the output of the detector 30 to provide an average signal output. This arrangement permits the user to obtain an output of either an instantaneous or average signal strength. In order to accomplish this, a second AND gate 34' is provided to control switch 33', and the two AND gates are controlled by opposite outputs of flip-flop 42. Ordinarily, flip-flop 42 is in its reset state enabling AND gate 34 so that the pager operates in exactly the same manner as described with respect to FIG. 1. A timer 41, however, provides the means to toggle the flip-flop 42 to enable AND gate 34' and thereby connect the output of averager 27 to the VCO 32. More specifically, if the button switch 28 is pressed and held for a period exceeding one second, this is detected by timer 41 which provides an output to the set input of flip-flop 42. When set, flip-flop 42 enables AND gate 34' and inhibits AND gate 34. However, at the end of the delay period of delay 43, the output of delay 43 resets the flip-flop 42, reestablishing the initial condition. Thus, by either pressing the button switch 28 quickly or holding it for one second or more, the user can select an instantaneous or average readout on indicator 26.

Figure 4:
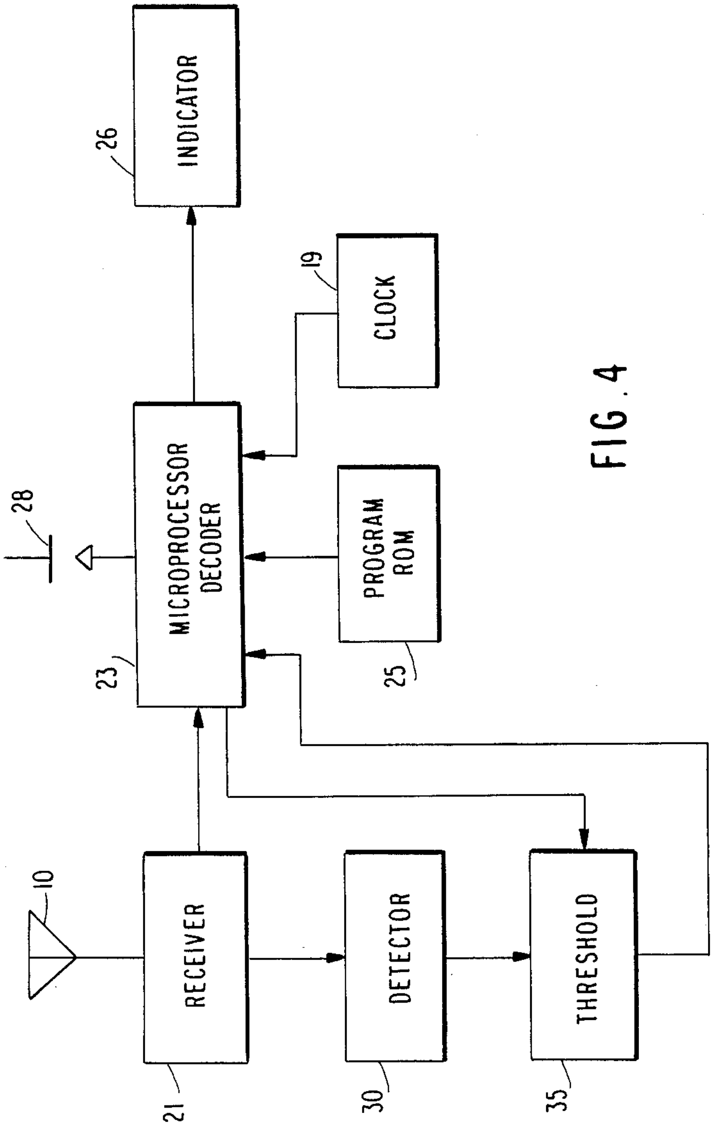
FIG. 4 is a block diagram of a pager which employs a programmed microprocessor.

Referring next to FIG. 4, there is shown in block diagram form a pager of the type which employs a microprocessor to perform the decoding function. The basic pager operations are the same, but due to the very large scale integration (VLSI) of microprocessors and supporting chip sets, the circuitry on the printed circuit board is somewhat simplified. The basic analog circuitry remains the same comprising an antenna 10 and a receiver 21, as before. The receiver includes the RF amplifier 12, the mixer 14, the local oscillator 16, the IF amplifier 18, and the discriminator 20. The output of the receiver 21 is supplied to an input of the microprocessor 23. The microprocessor also receives as inputs the output of an external clock 19, such as a crystal oscillator, and the push button switch 28. A read only memory (ROM) 25 stores the control program for the microprocessor.

In normal operation, the microprocessor 23 decodes the detected signal from the receiver 21 and, if the decoded message has the correct ID, the message is displayed on the indicator 26. This process is well understood in the prior art. According to the invention, the basic pager shown in FIG. 4 is further provided with a detector 30 connected to the output of the IF amplifier of receiver 21 and, for example, a threshold detector 35, much like the arrangement shown in FIG. 2; however, in this case the threshold detector is controlled by an output from the microprocessor 23, and the output of the threshold detector 35 is connected to an input of the microprocessor 23. As will be appreciated from the foregoing description of FIGS. 1, 2 and 3, the arrangement shown in FIG. 4 is but one possible embodiment of the invention. Those skilled in the art will appreciate that the threshold detector 35 could be an analog switch 33 controlled by the microprocessor 23, the switch in turn controlling a VCO which provides an output to the microprocessor. By suitable programming, this arrangement would support the functions of both FIGS. 1 and 3.

Figure 5A:
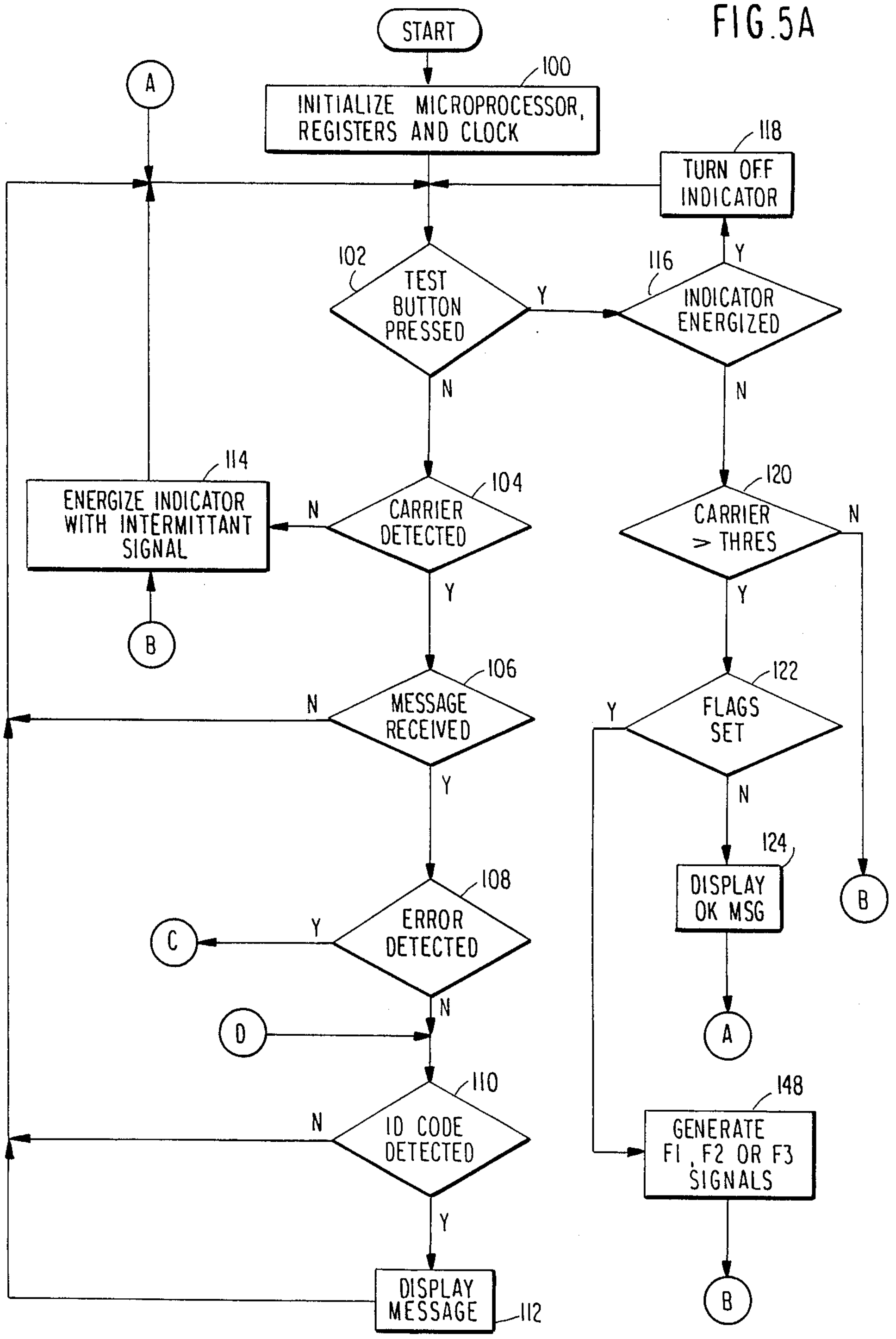
FIGS. 5A and 5B, taken together, are a flow diagram showing an example of the software or firmware used to control the microprocessor according to the invention.
Figure 5B:
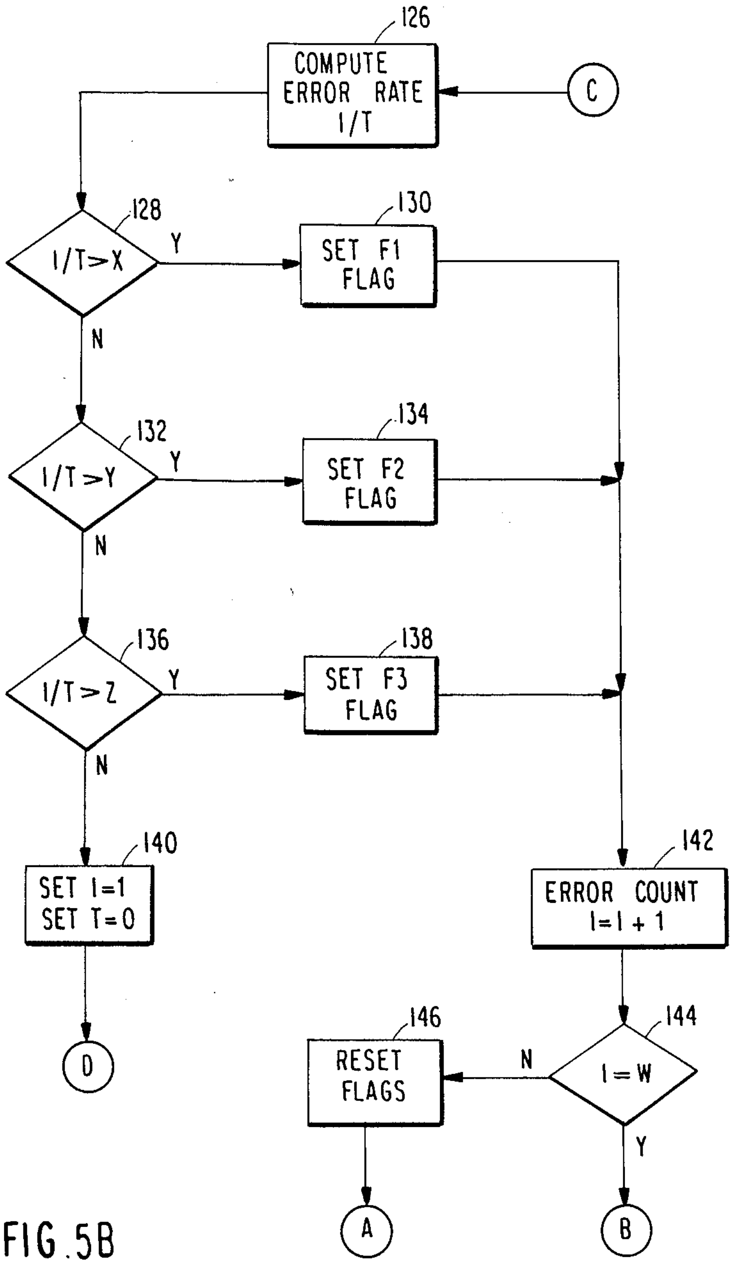

For the specific example shown in FIG. 4, the flow diagram of FIGS. 5A and 5B illustrates the logic of the software required to control the microprocessor 23. With reference to FIG. 5A, at power up, the microprocessor is initialized by resetting all internal registers and the clock, as indicated in function block 100. The switch 28 is monitored in decision block 102 to determine if it is pressed. If not, a test is made in decision block 104 to determine if a carrier is detected. Assuming for the moment that a carrier is detected, a test is next made in decision block 106 to determine if a message has been received. If not, control goes back to decision block 102, but if a message is received, a test is made in decision block 108 to determine if an error has been detected in the message. This might be, for example, the detection of a parity error in a simple case or the detection of an error using a more complex block code which allows some degree of error correction. For our purposes, it is only necessary to detect an error. For the moment, it will be assumed that no error has been detected. In this case, the next step in decision block 110 is to determine if the ID code for this pager has been detected. If so, the message is displayed in function block 112, and control loops back to decision block 102.

Assume now, that the test in decision block 104 is negative; that is, no carrier is detected. This is taken as a sure indication that the user is out of range of the transmitter and, as a result, the indicator is energized with an intermittent signal in function block 114 to alert the user to that fact. Control then goes to decision block 102.

In decision block 12, if it is detected that the switch 28 has been pressed, a test is nextmade in decision block 116 to determine if the indicator has been energized. Thus, far in this description, there are two conditions when the indicator would have been energized; first, when a message is displayed in function block 112, and second, when the indicator is energized with an intermittent signal in function block 114. If the test in decision block 116 is positive, the indicator is turned off in function block 118, and control reverts to decision block 102. However, as will be understood by those skilled in the art, if the indicator is energized because of a failure of carrier detection, pressing the switch 28 will not be effective to turn off the indicator, and it will be necessary for the user to turn off the power.

To further illustrate the test as it relates to the carrier, assume that the user wants to check the carrier strength. This is accomplished by pressing the switch 28 while the indicator 26 is not energized. In this case, a test is made in decision block 120 to determine if the carrier exceeds a predetermined threshold. This is accomplished by the microprocessor enabling the threshold detector 35 and polling its output. If the carrier is below the threshold, the indicator is energized with an intermittant signal in function block 114. Assuming that there is a carrier detected, although having an amplitude below the threshold, pressing the switch 28 again will be effective to turn off the indicator in function block 118. If the threshold is exceeded, a further test is made in decision block 122 to determine if any flags have been set. This test relates to another feature of the invention which is described in more detail hereinbelow. Assuming for now that no flags have been set, then an "OK" message is displayed in function block 122, and control returns to decision block 102.

It will be appreciated that only a slight modification of the program is required to support the functions of FIGS. 1 and 3. Instead of testing to determine if the carrier exceeds a predetermined threshold, the output of the VCO could, for example, be counted to provide a measured level of the carrier signal. This count could then be used to provide messages indicating relative signal strength of the carrier, perhaps "STRONG", "OK" and "WEAK". In addition, the count could be accumulated and averaged to provide an average signal level reading on the indicator. Again, the user could be provided with the option for instantaneous or average reading by simply pressing the switch 28 once or twice, for example.

Besides detection of carrier strength, the pager shown in FIG. 4 can be programmed to provide the user with an indication that the received signal is marginal. More specifically, the ability of the microprocessor to decode the message and, in addition, detect errors in the message can be used for this purpose. Thus, in FIG. 5A, if an error is detected in decision block 108, the error rate is computed in function block 126 of FIG. 5B. The error rate is the number of errors i divided by the time t. If the error rate is low, it may be assumed that the error just detected is not indicative of a loss of signal strength. Therefore, if the error rate is determined to be low as indicated by negative tests in decision blocks 128, 132 and 136, the error count i is set equal to 1, corresponding to the error just detected, and the clock is reset by setting t to 0, as indicated in function block 140. Control then passes to decision block 110 FIG. 5A.

On the other hand, if the error rate is determined to have exceeded a predetermined value x, then the $f_1$ flag is set in function block 130, the error count is incremented in function block 141, and a test is made in decision block 144 to determine if the error count has exceed a predetermined value w. If it has not, control returns to decision block 102; however, if the value w has been exceeded by the error count, then the indicator is energized with an intermittant signal in function block 114 in FIG. 5A. Since a carrier has been detected, the user can turn off the indicator by pressing switch 28. The ability to turn off the indicator in this case will provide the user with an indication of the type of problem in receiving a signal; i.e., with no carrier, the indicator can not be turned off, but with a carrier and a high error rate, the indicator can be turned off.

The additional tests made in decision blocks 132 and 136 allow for the monitoring of error rates at a given location. Thus, for example, if the error rate does not exceed x but does exceed a lesser value y as determined in decision block 132, the $f_2$ flag is set in function block 134 before control passes to function block 142. In like manner, if the error rate does not exceed y but does exceed a lesser value z as determined in decision block 136, the $f_3$ flag is set in function block 138 before control passes to function block 144. These flags are automatically reset in function block 146 after a predetermined period of time used to calculate whether the error count has exceeded the threshold w.

Now returning to decision block 122 in FIG. 5A, if any of the flags $f_1$, $f_2$ or $f_3$ are set, signals indicative of those flags are generated in function block 148. These signals may be but are not limited to, three signals of different frequencies which are readily identifiable with the three categories of error rates. These signals are used to drive the indicator 26 via the function block 114. Thus, even though a sufficient error count is not accumulated to energize the indicator to warn the user of an imminent loss of carrier, the user may monitor the error rate at different locations to assure the best possible reception.

While the invention has been described in terms of several preferred embodiment with various modifications, those skilled in the art will recognize that the invention can be practiced with further modification and alteration within the spirit and scope of the appended claims.

Having thus described my invention, what I claim as new and desire to secure by Letters Patent is as follows:

1. A paging device comprising:

a radio receiver;.

decoding circuitry connected to an output of said radio receiver, said radio receiver receiving an encoded transmitted signal and supplying a demodulated signal at its output to said decoding circuitry for decoding by said decoding circuitry;

an indicator connected to said decoding circuitry, said decoding circuitry energizing said indicator to alert a user that a call has been received when a decoded demodulated signal matches a code for said paging device;

signal strength detector and monitoring means connected to said receiver for detecting and monitoring the strength of a carrier signal for said transmitted signal;

energizer means which, when connected to said signal strength detector and monitoring means, for providing an output to said indicator representing the monitored strength of said carrier signal; and switch means on said paging device which when activated by a user, provides a temporary connection between said signal strength detector and monitoring means and said energizer means.

2. The paging device recited in claim 1 wherein said energizer means comprises variable frequency oscillator means which, when connected to said signal strength detector and monitoring means, provides an output having a frequency proportional to the monitored strength of said carrier signal.

3. The paging device recited in claim 2 wherein said switch means comprises:

an analog switch connected between said signal strength detector and monitoring means and said variable frequency oscillator means;

gate means connected to control said analog switch; and a manually operated switch on said paging device operable by the user and connected to enable said gate means when operated by the user.

4. The paging device in claim 2 further comprising:

averaging means connected to said signal strength detector and monitoring means for averaging the strength of said carrier signal; and selective means for selectively connecting the output of said signal strength detector and monitoring means or said averaging means to said variable frequency oscillator means.

5. The paging device recited in claim 1 wherein said energizing means comprises threshold means which, when connected to said signal strength detector and monitoring means, provides an output to said indicator indicative of whether said carrier signal exceeds a minimum strength for reliable reception.

6. The paging device recited in claim 1 wherein said decoding circuitry includes a microprocessor operating under control of a program stored in memory, said microprocessor responding to said switch means and controlling said energizer means.

7. The paging device recited in claim 6 wherein said switch means normally being operable to turn off said indicator after being energized by said decoding circuitry, further comprising timing means for automatically turning off said indicator after being energized by said energizer means.

8. In a paging device of the type including a radio receiver and a decoder for receiving an encoded transmitted signal and operative to energize an indicator to alert a user that a call has been received, said paging device being provided with a switch operable by the user, the process of alerting the user when the paging device is not reliably receiving messages comprising the steps of:

detecting and monitoring the strength of a carrier signal for said transmitted signal;

detecting if the user has actuated said switch; and when the user actuates said switch, determining if the indicator is energized and if it is energized, turning off said indicator before energizing said indicator to provide an indication of the strength of the carrier; but if the indicator is not energized, immediately energizing said indicator to provide said indication of the strength of the carrier.

9. The process recited in claim 8 further comprising the steps of:

detecting errors in messages received by said paging device;

computing the error rate of detected errors;

if the computed error rate exceeds a first predetermined value, accumulating an error count;

comparing the accumulated error count with a predetermined threshold; and if the accumulated error count exceeds said predetermined threshold, energizing said indicator to alert the user.

10. The process recited in claim 9 further comprising the steps of:

checking the computed error rate to determine if the error rate exceeds first, second or third values, and if so, setting corresponding first, second or third flags; and if the user has actuated said switch and the indicator is not energized, energizing said indicator at a rate identifiable with said first, second or third flags according to which flag is set.

11. The process recited in claim 8 further comprising the steps of:

determining instantaneous and average strengths of said carrier;

detecting whether the user has actuated said switch to request an instantaneous or average reading of said carrier; and depending on the user's request, providing an output to said indicator of said instantaneous or average strength of said carrier.

12. The process recited in claim 8 further comprising the step of immediately alerting the user if no carrier signal is detected by energizing said indicator without the user actuating said switch.

13. The process recited in claim 8 further comprising the step of automatically turning off said indicator after a predetermined period of time.

14. A paging device comprising:

a radio receiver;

decoding means connected to an output of said radio receiver, said radio receiver receiving an encoded transmitted signal and supplying a demodulated signal at its output to said decoding means for decoding;

an indicator connected to said decoding means, said decoding means energizing said indicator to alert a user that a call has been received when a decoded demodulated signal matches a code for said paging device;

signal strength detector and monitoring means connected to said receiver for detecting and monitoring the strength of a carrier signal for said transmitted signal;

energizer means which, when connected to said signal strength detector and monitoring means, for providing an output to said indicator representing the monitored strength of said carrier signal;

switch means operable by a user for providing a temporary connection between said signal strength detector and monitoring means and said energizer means;

said decoding means including means for detecting if the user has operated said switch, and when the user operates said switch, determining if the indicator is energized and if it is energized, turning off said indicator before energizing said indicator to provide an indication of the strength of the carrier, but if the indicator is not energized, immediately energizing said indicator to provide said indication of the strength of the carrier.

15. The paging device recited in claim 14 wherein said decoding means includes a microprocessor operating under control of a program stored in memory, said microprocessor responding to said switch means for controlling said energizer means.

16. The paging device recited in claim 15 wherein said energizer means comprises variable frequency oscillator means which, when connected to said signal strength detector and monitoring means, provides an output having a frequency proportional to the monitored strength of said carrier signal.

17. The paging device recited in claim 16, wherein said switching means comprises an analog switch connected between said signal strength detector and monitoring means and said variable frequency oscillator means, said analog switch being controlled by said microprocessor.

18. The paging device recited in claim 16 further comprising:

averaging means connected to said signal strength detector and monitoring means for averaging the strength of said carrier signal; and selective means controlled by said microprocessor for selectively connecting the output of said signal strength detector and monitoring means or said averaging means to said variable frequency oscillator means.

19. The paging device recited in claim 15 wherein said energizing means comprises threshold means which, when connected to said signal strength detector and monitoring means by said microprocessor, provides an output to said indicator indicative of whether said carrier signal exceeds a minimum strength for reliable reception.

20. The paging device recited in claim 15 wherein said switch means normally being operable to turn off said indicator after being energized by said decoder means, further comprising timing means in said microprocessor for automatically turning of said indicator after being energized by said energizer means.

* * * * *